(12) United States Patent
Deppe et al.

(10) Patent No.: US 6,705,172 B1
(45) Date of Patent: Mar. 16, 2004

(54) METHOD AND DEVICE FOR DETECTING AND COMPENSATING ZERO POINT INFLUENCES ON CORIOLIS MASS FLOWMETERS

(75) Inventors: Lothar Deppe, Goettingen (DE); Ralf Lesjak, Rosdorf (DE); Axel Papenbrock, Goettingen (DE)

(73) Assignee: Bailey-Fischer & Porter GmbH, Goettingen (DE)

( * ) Notice: Subject to any disclaimer, the term of this patent is extended or adjusted under 35 U.S.C. 154(b) by 0 days.

(21) Appl. No.: 09/423,265

(22) PCT Filed: May 7, 1998

(86) PCT No.: PCT/DE98/01356

§ 371 (c)(1),
(2), (4) Date: Feb. 1, 2000

(87) PCT Pub. No.: WO98/52000

PCT Pub. Date: Nov. 19, 1998

(30) Foreign Application Priority Data

May 9, 1997 (DE) .......................... 197 19 587

(51) Int. Cl.$^7$ .................................................. G01F 1/78
(52) U.S. Cl. .................................................. 73/861.355
(58) Field of Search .................. 73/861.335, 861.56, 73/861.57, 861.357, 504.02, 504.13

(56) References Cited

U.S. PATENT DOCUMENTS

| | | | | | |
|---|---|---|---|---|---|
| 4,876,898 A | * | 10/1989 | Cage et al. | ............ | 73/861.355 |
| 5,044,207 A | * | 9/1991 | Atkinson et al. | ...... | 73/861.357 |
| 5,321,991 A | * | 6/1994 | Kalotay | ................. | 73/861.357 |
| 5,495,760 A | * | 3/1996 | Wirt | ........................ | 73/504.13 |
| 5,604,311 A | * | 2/1997 | Kumar et al. | ............ | 73/504.02 |
| 5,734,112 A | * | 3/1998 | Bose et al. | .............. | 73/861.56 |
| 5,831,178 A | * | 11/1998 | Yoshimura et al. | .... | 73/861.357 |

* cited by examiner

Primary Examiner—Edward Lefkowitz
Assistant Examiner—Charlene Dickens
(74) Attorney, Agent, or Firm—Michael M. Rickin

(57) ABSTRACT

A method and a device for measuring the flow rate of flowing, in particular liquid media using the Coriolis measurement principle, in which a measuring tube flowed through by the medium can be set vibrating and the deflection of the measuring tube is measured at at least two different measuring points via sensors and the flow rate can be determined from the amplitude and further vibration parameters with the aid of an electric evaluation unit. In this case, a further sensor is arranged at the site of vibration generation and the two other sensors are placed at sites which are arranged symmetrically with regard to their distance, referred to the tube section of the measuring tube, from the site of vibration generation. The evaluation unit contains logic means which, in the event of failure of one of the sensors, on the one hand report this, and on the other hand simulate the defective sensor in terms of evaluation by interpolation until the defective sensor is replaced.

19 Claims, 8 Drawing Sheets

Figure 10:

| Operating state | Sensor A | Sensor B | Sensor/ Driver C | Sensor/ Driver D | Sensor T1 | Sensor T2 |
|---|---|---|---|---|---|---|
| 1. All sensors in order | Mass flow calculation | Mass flow calculation | Qm (compensation of zero shifts) | Vibration generation | Temperature measurement | Temperature measurement (optional) |
| 2. Failure Sensor A | Failure | Mass flow calculation | Mass flow calculation | Vibration generation | Temperature measurement | Temperature measurement (optional) |
| 3. Failure Sensor B | Mass flow calculation | Failure | Mass flow calculation | Vibration generation | Temperature measurement | Temperature measurement (optional) |
| 4. Failure Sensor/Driver C | Mass flow calculation | Mass flow calculation | Failure | Vibration generation | Temperature measurement | Temperature measurement (optional) |
| 5. Failure Sensor/Driver D | Mass flow calculation | Mass flow calculation | Vibration generation | Failure | Temperature measurement | Temperature measurement (optional) |
| 6. Mass flow Calculation | Mass flow calculation | Mass flow calculation | Qm (compensation of zero shifts) | Vibration generation | Failure | Temperature measurement |
| 7. Failure Sensor T2 | Mass flow calculation | Mass flow calculation | Qm (compensation of zero shifts) | Vibration generation | Temperature measurement | Failure |
| 8. Increased driver power | Mass flow calculation | Mass flow calculation | Qm (compensation of zero shifts) | Vibration generation | Temperature measurement | Temperature measurement (optional) |

METHOD AND DEVICE FOR DETECTING AND COMPENSATING ZERO POINT INFLUENCES ON CORIOLIS MASS FLOWMETERS

FIELD OF THE INVENTION

This invention relates to a method and a measuring instrument for measuring, in particular, the flow rate of flowing media using the Coriolis principle, having at least one measuring the conducting the flowing medium, at least one vibrator which sets the measuring tube vibrating, and having at least two sensors which detect the tube movement and an electronic evaluation system which processes the measuring signals.

DESCRIPTION OF THE PRIOR ART

Coriolis mass flow meters for flowing media are widespread, and are known in very varied embodiments.

In general, in the case of a Coriolis mass flow meter at least one measuring tube which is symmetrical relative to its geometrical midpoint is set vibrating by a vibrator. The vibration of the measuring tube is monitored in this case by a control circuit which receives its actual value information from at least one of the above-named sensors which detect the tube movement.

The vibration of the measuring tube causes the Coriolis force in the flowing medium. The Coriolis force oscillates with the frequency of the tube vibration. It causes an additional movement which is superimposed on the tube movement excited by the vibrator, and leads to a small, phase-shifted movement of the tube sections about the geometrical midpoint of the measuring tube. This phase shift represents the measuring effect. It is proportional to the Coriolis force and, therefore, proportional to the flowing mass. The tube movement is detected by two sensors, arranged in general symmetrically relative to the tube midpoint, and is fed to the electronic measurement system for evaluation.

The Coriolis force is defined as (complex phasors are represented by an underscore):

$$\underline{Fc} = -2m(\omega \times \underline{v})$$

where $\omega$=angular velocity of the measuring tube and $\underline{v}$=rate of flow of the liquid in the measuring tube.

Since the angular velocity is a function of the tube amplitude, the measuring signal is also a function of the amplitude. Consequently, the evaluation is standardized to the tube amplitude, that is to say m=measuring signal/tube amplitude. In component nomenclature, the two sensor signals are as follows for the abovementioned symmetrical processes:

$$\underline{A} = \underline{R} + \underline{Fc} \text{ and } \underline{B} = \underline{R} - \underline{Fc}$$

where $\underline{R}$=tube amplitude and $\underline{Fc}$=Coriolis amplitude.

By addition, this yields twice the tube amplitude $$\underline{A} + \underline{B} = 2\underline{R}$$

and by subtraction twice the Coriolis amplitude $$\underline{A} - \underline{B} = 2\underline{Fc}$$

at the position of the sensors. If asymmetrical signal interference now occurs in the case of which individual signal components, or else both components of the sensors change, this leads to measuring errors and control problems.

The geometrical midpoint of the measuring tube is free from additional movements caused by the Coriolis force. In many embodiments of mass flow meters, it is the fastening point of the above-named vibrator.

The installation of the vibrating system of the "Coriolis mass flow meter" in a piping system couples the mass flow meter to the environment vibrationally. Consequently, it is possible to excite both structural and hydraulic vibrations at the operating frequency of the mass flow meter which cause reactions in the mass flow meter and are not detected by the electronic measurement system. The interactions of these vibrations generally occur asymmetrically and can lead to substantial disturbances of the measuring instrument. A possible consequence of these interactions are instabilities in the control loop, that is to say functional disturbances can occur.

The most unfavorable consequence of these interactions are substantial disturbances of the metrological properties. The cause of this is static and dynamic zero shifts.

Static zero shifts, that is to say apparent measuring signals in the case of a zero flow rate, are usually compensated by means of the electronic measurement system. Since they feature in the flow rate calculation as an offset, the static zero shifts lead to large measurement value deviations, particularly in the lower flow rate range of the mass flow meter.

Here, dynamic zero shifts are the additional shifts, not constant as a rule, occurring during throughflow owing to parameter variation in the installation. They are characterized by the fact that, as variables which are dependent on all possible process parameters and have not so far been capable of identification, quantification and compensation, they result in measured value deviations, which have not so far been correctable, over the entire measuring range, and additionally lead to problems in reproducibility.

Starting from these problems, it is the object of the invention with regard to a method and a mass flow instrument to achieve compensation of the static and dynamic interference on the operational and metrological response independently of the measuring tube design, and to render the overall system insusceptible to interference.

SUMMARY OF THE INVENTION

The invention is distinguished in that in addition to the two sensors arranged symmetrically relative to the site of vibration, a further, third sensor is arranged at the site of vibration generation on an arbitrarily shaped measuring tube. The result is to produce a spatially fixed point via which the reference position of the deflections occurring at the two other sensors is clearly defined.

The absolute value of the added amplitudes $\underline{A}+\underline{B}$ such as is frequently used for amplitude control depends on the phase shift caused by the Coriolis force.

By contrast, the third sensor according to the invention supplies as further measuring signal the pure tube amplitude, and thus an actual-value signal, independent of flow rate and interference, for the control circuit. By means of this additional signal, the two symmetrically arranged sensors are used to calculate the mass flow from the signal of respectively one of these sensors and the tube amplitude signal of the third sensor, that is to say the mass flow is calculated 2 times. The two flow rates determined by means of the third sensor correspond in this case to the real processes around the geometrical midpoint of the measuring tube. The sum of the two flow rates yields the flow rate, as indicated above. The two flow rates determined are equal, since in the normal operating state the signals are symmetrical, as stated above. Should instances of interference arise—these being generally asymmetrical, as stated above—the additionally determined flow rate become asymmetrical, the direction of the interference becoming detectable.

The sum likewise changes, that is to say the instrument measures wrongly owing to the interference. They symmetry is restored and the interference is eliminated by continuously comparing the calculated flow rate and using appropriate correction algorithms to correct the signal side influenced by interference.

This achieves the object of eliminating interference from the metrological response.

A further subaspect of the object, which is intended to improve the operational response, is achieved by two special configurational features according to the invention. Redundancy is provided by the two-fold determination of the flow rate. In the case of severe interference or a failure of a sensor, an evaluation section can be used to maintain full measurement capacity. However, elimination of interference no longer obtains. The control response is improved by virtue of the fact that an actual-value signal is available which is not influenced by the flow rate. A further important aspect of the invention resides in that the failure (overshooting of the previously fixed tolerance limit) of a sensor is automatically detected by the measuring transducer, and the detection of measured values is altered in such a way that the instrument continues to operate acceptably.

The user is advised by the software (display or communication) of the failed sensor, and can institute repair measures if appropriate. These need not be performed immediately, but whenever the process allows. The probability of a total failure of the measurement system can thereby be substantially reduced. The system is, as it were, of redundant design.

The mode of operation of the invention is represented by way of example below. To explain the problems which have been solved, the zero-point compensation is briefly derived formally further below with the aid of the 3 sensors arranged according to the invention.

However, firstly the redundant mode of operation and/or redundant design of the method and the device is described:

In order to set the measuring tube vibrating mechanically, an electromagnetic device is used to apply a force to the measuring tube (sensor/driver C or sensor/driver D of FIG. 9). The force is proportional to the current through the driver coil. The measuring tube is a resonant circuit with a quality Q.

The driver current required to generate a mechanical vibration amplitude A is a function of the quality, that is to say the losses of the mechanical resonant circuit. The highest quality is to be found in the case of the non-installed, empty pickup, that is to say the driver current is lowest. This reference value is measured and stored.

After installation of the pickup and filling with a medium, the damping of the resonant circuit can be increased, that is to say the driver current increases. This current is also measured and stored. A system zero point compensation is likewise carried out in this operating state, that is to say the flow rate indication is set to zero. Should operating states now arise in which vibrational energy is transferred to the outside by hydraulic or mechanical coupling (for example in the case of gas-containing media or gas bubbles in the installation), the damping of the mechanical resonant circuit increases, and therefore the driver current increases.

Feedback of the dissipated vibrational energy produces a shift in the dynamic zero point which is proportional to the driver current.

Consequently, it is possible to use the continuously measured driver current to achieve the absolute value of the dynamic system zero point. The sign is determined with the aid of the third sensor.

Furthermore, a damped mechanical resonant circuit has a slightly different frequency than an undamped one. This affects the density measurement, since the density of the medium located in the pickup is calculated from the resonant frequency of the pickup. It is possible to use the measured driver current to compensate this frequency shift.

Consequently, it is possible to use the third sensor and a measurement of the driver current to compensate a dynamic zero shift and a density shift on the basis of a varying damping of the pickup resonant circuit.

DESCRIPTION OF THE DRAWING

In the drawing:

FIG. 10 shows an operating state matirx of the system in accordance with FIG. 9.

DESCRIPTION OF THE PREFERRED EMBODIMENTS(S)

Figure 1:
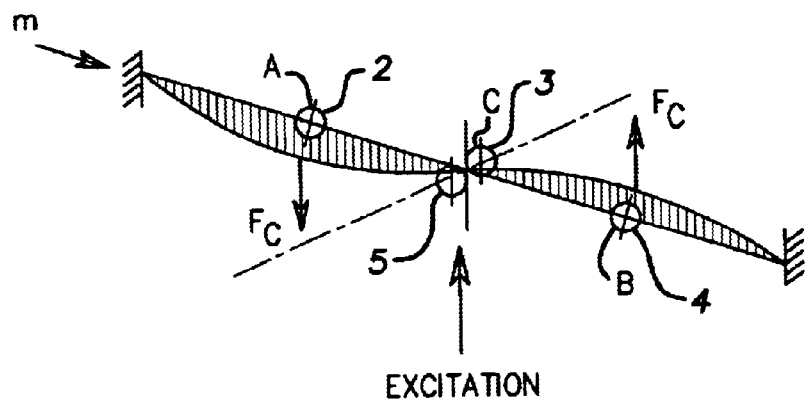
FIG. 1 shows the vibration model for a straight tube guidance.

FIG. 1 shows the vibration model for a straight tube guidance in the region of the measuring section. That tube section for which the flow rate occurring there is to be measured is represented by a model.

Figure 2:
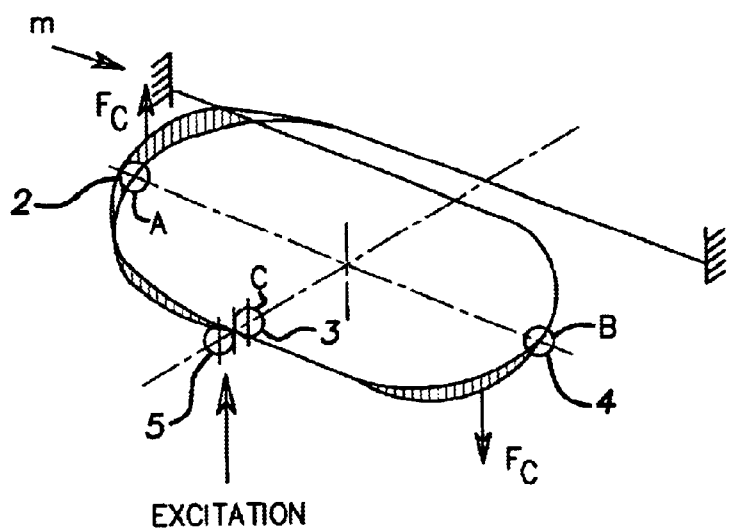
FIG. 2 shows the vibration model for a compact wound tube guidance.

FIG. 2 shows a vibration model of a tube guidance wound in the measuring section. This guidance is selected when the flow rate measuring instrument is to be of compact design.

The fundamental mode of the measuring tube at the points A, B and C in accordance with FIG. 1 and FIG. 2 can be described as follows:

$$s_{gw,gh,gc}(t) = \hat{S}_{a,b,c} \cdot \left(\sin \omega t + / - \frac{\varphi}{2}\right) \quad \text{Equation 1}$$

The phase shift φ is produced by the Coriolis forces acting on the measuring tube and is divided, with reference to the point of symmetry C, between the points A and B. That is to say, at point C the phase shift is φ=0, at point A the phase shift is −φ/2, and at point B it is +φ/2.

For the considerations which follow, the amplitudes are standardized with reference to the amplitude at point C.

$$k_a = \frac{\overline{S}_c}{\overline{S}_a}$$

$$k_b = \frac{\overline{S}_c}{\overline{S}_b}$$

$$k_c = 1$$

It follows that:

$$s_a(t) = \hat{S}_a \cdot \left(\sin \omega t - \frac{\varphi}{2}\right) \cdot k_a$$

$$s_b(t) = \hat{S}_b \cdot \left(\sin \omega t - \frac{\varphi}{2}\right) \cdot k_b$$

$$s_c(t) = \hat{S}_c \cdot (\sin \omega t)$$

The consideration is simplified by conversion into complex phasors (complex phasors are represented by an underscore, and the absolute value of the complex phasor is represented without an underscore).

$$\underline{\hat{a}} = \frac{s_a(t)}{c^{j\alpha c}}$$

$$\underline{\hat{b}} = \frac{s_b(t)}{a^{j\alpha c}}$$

$$\underline{\hat{c}} = \frac{s_c(t)}{c^{j\alpha c}}$$

The complex root-mean-square value is then:

$$\underline{A} = \frac{\hat{a}}{\sqrt{2}}$$

$$\underline{B} = \frac{\hat{b}}{\sqrt{2}}$$

$$\underline{C} = \frac{\hat{c}}{\sqrt{2}}$$

The following is then obtained at points A, B and C in the complex normal form:

Sum form:

Exponential form:

$$\underline{A} = c_a - ja \quad \underline{A} = A \cdot e^{j-\phi/2}$$

$$\underline{B} = c_b + ja \quad \underline{B} = B \cdot e^{j+\phi/2}$$

$$\underline{C} = c \quad \underline{C} = C$$

φ being proportional to the mass flow rate. The phasor C is always real, since it forms the real axis of the coordinate system.

The difference of the reference point C relative to A and B is:

$$\underline{D}_{CA} = \underline{C} - \underline{A}$$

$$\underline{D}_{CB} = \underline{C} - \underline{B}$$

The component depending on flow rate is:

$$\underline{D}_{CACB} = \underline{D}_{CA} - \underline{D}_{CB}$$

This corresponds to the component depending on flow rate in the case of considering only two sensors $\underline{A}$ and $\underline{B}$:

$$\underline{D}_{BA} = \underline{B} - \underline{A} = \underline{D}_{CACB}$$

Moreover, the three sensors yield a component for compensation in the case of asymmetries:

$$\underline{S}_{CACB} = \underline{D}_{CA} + \underline{D}_{CB}$$

The flow rate can now be calculated in the following way:

$$Qm = k \cdot \arctan\frac{Im(D_{CACB} + |S_{CACB}|)}{C} \qquad \text{Equation 2}$$

κ is the proportionality constant and includes material constants such as, for example, the tube geometry and the material stiffness.

For small phase shifts it holds that: $\tan\phi = \phi$.

$$Qm = k \cdot \frac{Im(\underline{D}_{CACB} + |\underline{S}_{CACB}|)}{C} \qquad \text{Equation 3}$$

The flow rate Qm is therefore yielded by determining the measured values for the appropriate phase angle. The aim now is to use various numerical examples to illustrate the mode of operation of the zero point compensation.

The example presented are numerical examples. The specified values do not correspond to reality but are intended only to illustrate the mode of operation of the compensation.

Figure 3:
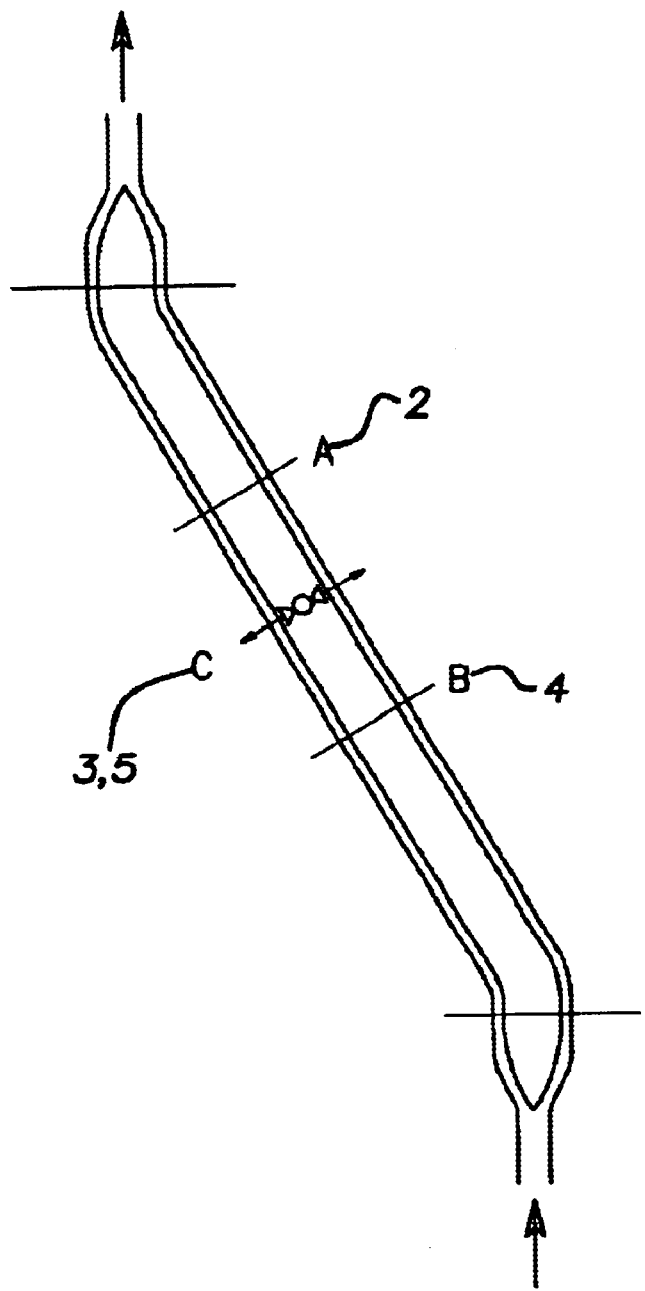
FIG. 3 shows an embodiment having a two-fold parallel tube guidance in the measuring section.
Figure 7:
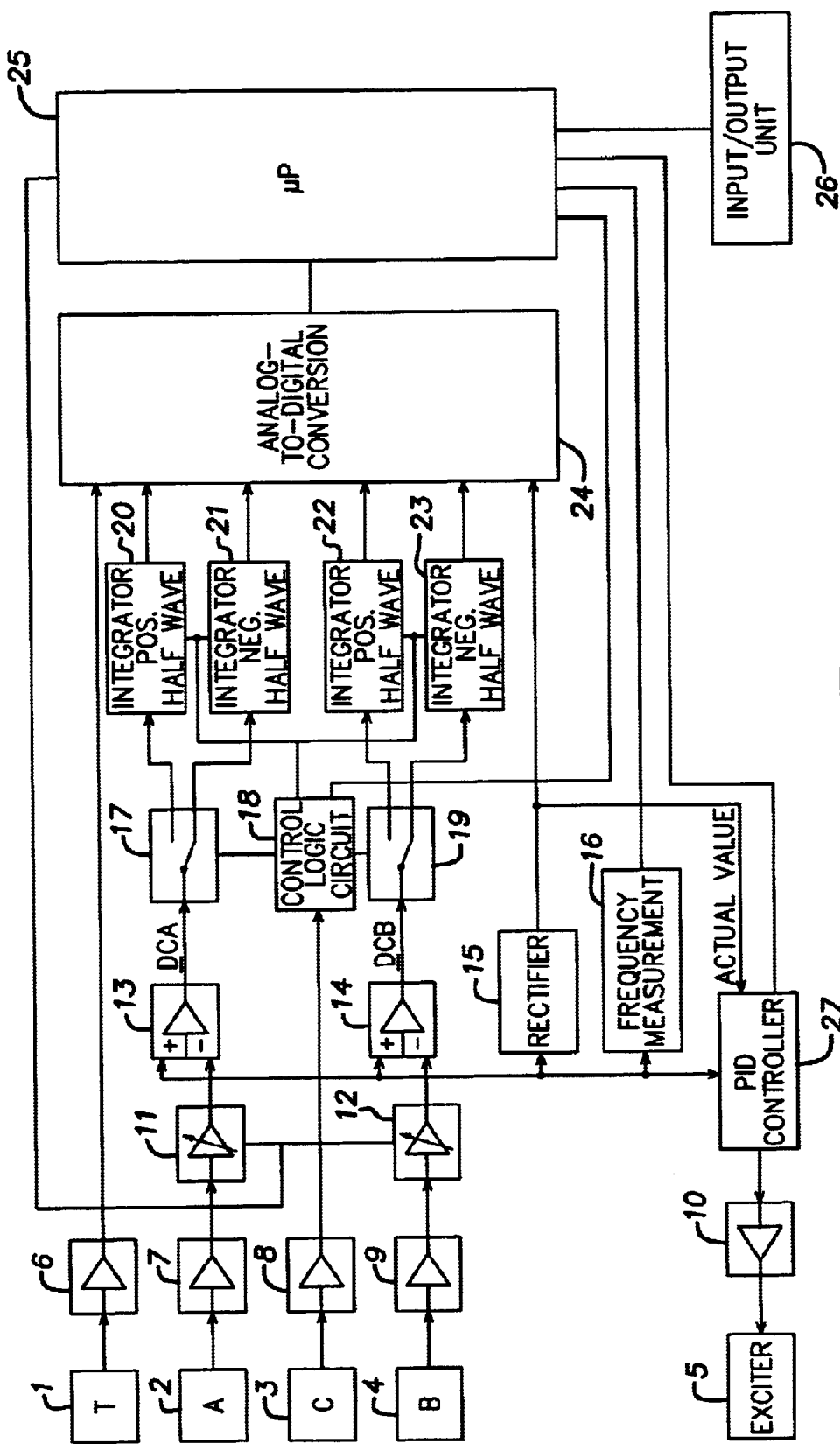
FIG. 7 shows a block diagram for analog calculation of $\underline{D}_{CA}$ and $\underline{D}_{CB}$.
Figure 8:
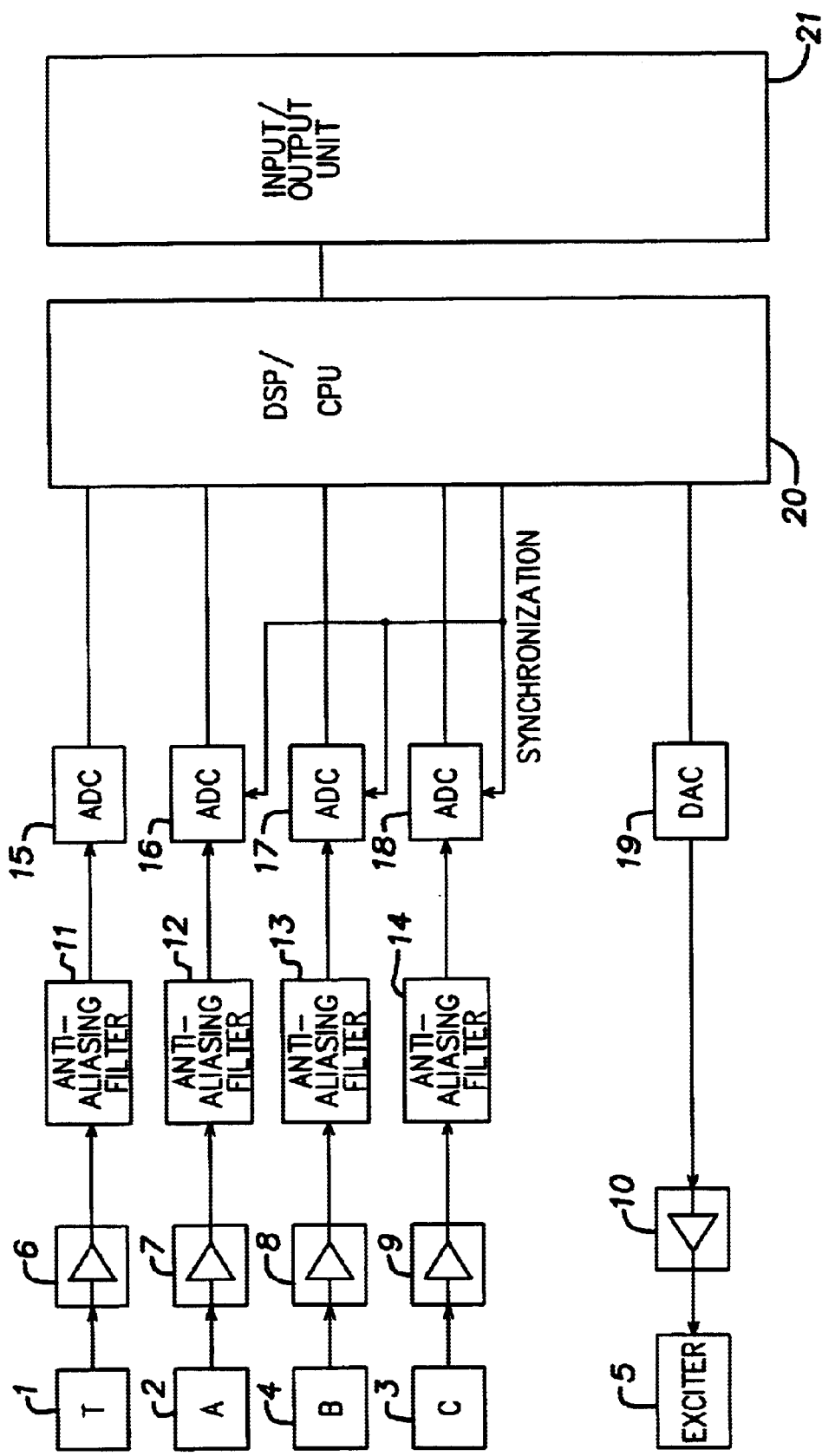
FIG. 8 shows the electronic implementation relating to the hardware in FIG. 7.

Firstly, FIG. 3 shows a possible design having a two-fold parallel tube guidance in the measuring section. The liquid flow, entering at the bottom, is divided into two tubes running in parallel. Arranged at the measuring sites A and B are sensors, for example displacement sensors, via which the vibration amplitudes can be determined. These sensors are connected to an electronic system which is represented in FIG. 7 and FIG. 8 and by means of which further vibration parameters can be determined. According to the invention, a further sensor is arranged at the vibrator or at the site of vibration generation C. It is possible in this way to determine the amplitude and the precise zero phase angle. Starting from this, the precise phase angles of the vibrations can be determined at the sites A and B. The division of the test liquid flow into two subflows has the advantage that the measurable amplitude is doubled by counterphase excitation and that, furthermore, resonant vibrations and secondary modes are compensated. Furthermore, in a refinement according to the invention a temperature sensor is provided which can be used to measure the measuring tube temperature, which is also taken into account in the further evaluation of temperature-dependent variables.

EXAMPLE 1

No Flow Rate

Figure 4:
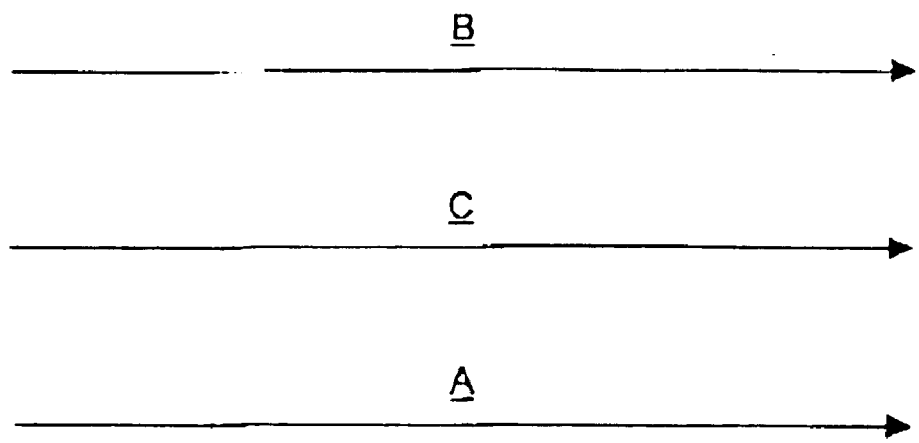
FIG. 4 shows a vector diagram, $1^{st}$ example, no flow rate.

FIG. 4 shows the appropriate vector diagram for this. Sensor signals:

$$\underline{A} = 5$$

$$\underline{B} = 5$$

$$\underline{C} = 5$$

Calculations:

$$\underline{D}_{CA} = \underline{C} - \underline{A} = 5 - 5 = 0$$

$$\underline{D}_{CB} = \underline{C} - \underline{B} = 5 - 5 = 0$$

$\underline{D}_{CACB} = \underline{D}_{CA} - \underline{D}_{CB} = 0$ $\underline{S}_{CACB} = \underline{D}_{CA} + \underline{D}_{CB} = 0$ Result:

$$Qm = k \frac{Im(\underline{O}_{CACB} + |\underline{S}_{CACB}|)}{C} = 0$$

The corresponding phasor diagram is represented in FIG. 4. The phasors, that is to say the vectors, are parallel and of equal length in this representation; the result is that: the flow rate is zero.

EXAMPLE 2

Non-zero Flow Rate Without Interference

Figure 5:
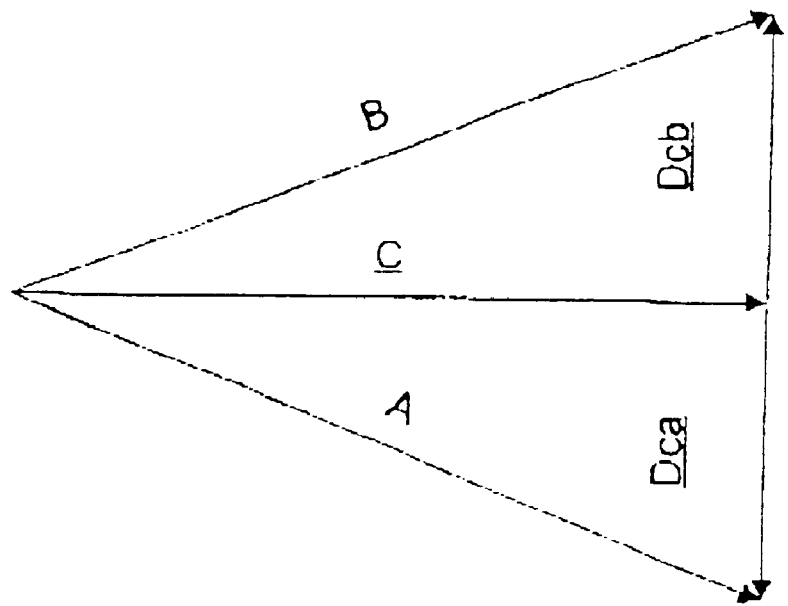
FIG. 5 shows a vector diagram, $2^{nd}$ example, with flow rate.

FIG. 5 shows the appropriate vector diagram.
Sensor signals:

$\underline{A} = 5 - j2$ $\underline{B} = 5 + j2$ $\underline{C} = 5$

Calculations:

$\underline{D}_{CA} = \underline{C} - \underline{A} = (5) - (5 - j2) = 0 + j2$ $\underline{D}_{CB} = \underline{C} - \underline{B} = (5) - (5 + j2) = 0 + -j4$ $\underline{D}_{CACB} = \underline{D}_{CA} - \underline{D}_{CB} = (j2) - (-j2) = 0 + j4$ $\underline{S}_{CACB} = \underline{D}_{CA} + \underline{D}_{CB} = (j2) + (-j2) = 0 + j0$ Result:

$$Qm = k \frac{Im(\underline{O}_{CACB} + |\underline{S}_{CACB}|)}{C} = k \cdot \frac{4 + 0}{5} = 0.8 \cdot k$$

That is to say, in this example there is a flow rate Qm of 0.8 k.

It may be seen that the phasor diagram is symmetrical, that is to say the vibration, that is to say the phase shift, as well, resulting from the non-zero throughflow occurs symmetrically. See FIG. 5.

EXAMPLE 3

Throughflow, Interferer Additive to A with 180° Phase Angle Relative to C

Figure 6:
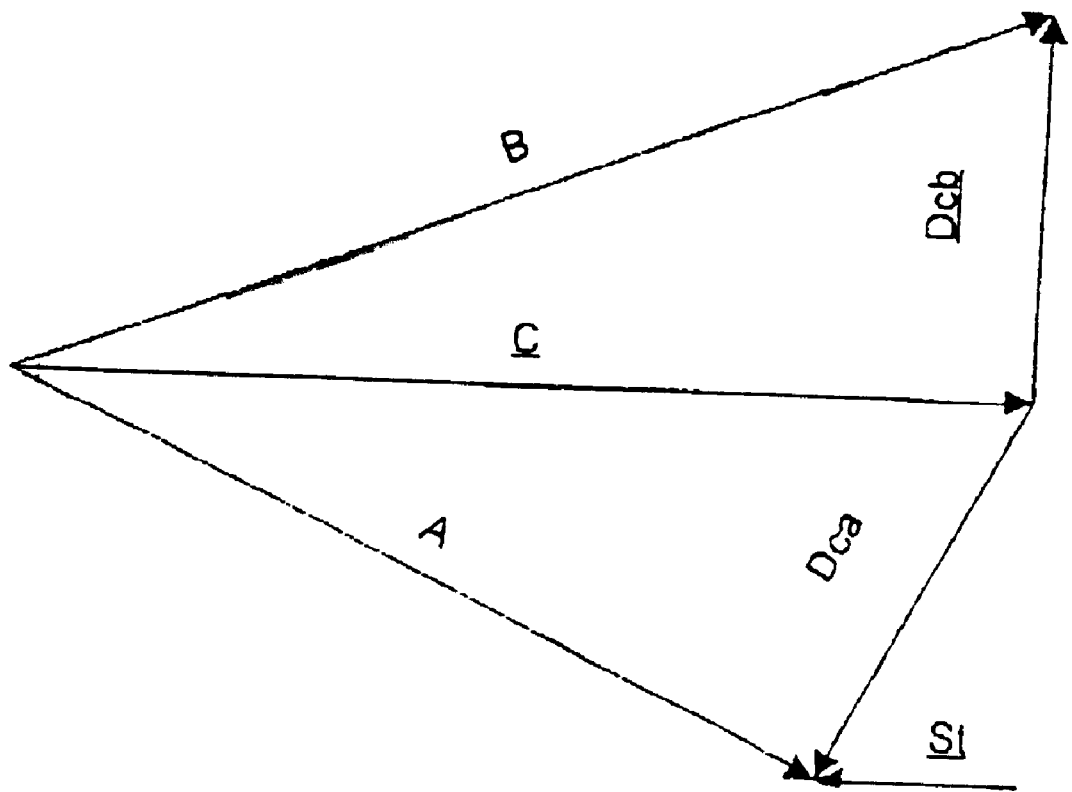
FIG. 6 shows a vector diagram, $3^{rd}$ example, flow rate with interference.

FIG. 6 shows the appropriate vector diagram.
Interference signal additive to sensor A:

$\underline{St} = -1$

Sensor signals:

$\underline{A} = 4 - j2$ $\underline{B} = 5 - j2$ $\underline{C} = 5$

Calculations:

$\underline{D}_{CA} = \underline{C} - \underline{A} = (5) - (4 - j2) = 1 + j2$ $\underline{D}_{CB} = \underline{C} - \underline{B} = (5) - (5 + j2) = 0 - j2$ $\underline{D}_{CACB} = \underline{D}_{CA} - \underline{D}_{CB} = (1 + j2) - (-j2) = 1 + j4$ $\underline{S}_{CACB} = \underline{D}_{CA} + \underline{D}_{CB} = (1 + j2) + (-j2) = 1 + j0$ Result:

$$Qm = k \frac{Im(\underline{O}_{CACB} + |\underline{S}_{CACB}|)}{C} = k \cdot \frac{4 + 0}{5} = 0.8 \cdot k$$

As is to be seen in FIG. 6, the vibration components are no longer symmetrical: either in amplitude or in phase angle. Thus, the arrangement according to the invention of the third sensor at the site of vibration generation renders it possible to determine the phase reference point around C precisely using the 3 available signals A, B, C. Starting therefrom, the interference signals as such can now be assigned precisely and, as such, be compensated very precisely both as to absolute value and as to phase angle.

In an arrangement with the usual two sensors, it would certainly be possible to detect an asymmetry in the vibration, but not its phase angle and its amplitude. Effective compensation would therefore not be possible.

In the mode of procedure, according to the invention, with three sensors, the third sensor being placed at the site of vibration generation, the interferer therefore no longer has an effect on the calculation of the actual flow rate.

Two methods and two devices for the metrological solution are described below with two block diagrams, FIGS. 7 and 8.

FIG. 7 represents the hardware for the purpose of analog calculation of $\underline{D}_{CA}$ and $\underline{D}_{CB}$.

The inclusion, according to the invention, of three sensor values is also taken into account in this case.

Three sensors (2) (3) (4) for detecting the tube movement are fastened on the measuring tube.

Movement sensors, speed sensors and acceleration sensors come into consideration as possible sensors. The sensor signals are amplified with the aid of the preamplifiers (7) (8) (9). The gain $k_a$ and $k_b$ of the amplifiers (11) and (12) which can be adjusted by the processor is set in such a way that the signals $\underline{A}$, $\underline{B}$ and $\underline{C}$ have the same amplitude. The difference amplifiers (14) and (15) form the difference $\underline{D}_{CA}$ and $\underline{D}_{CB}$. From the sensor signal $\underline{C}$, the control logic circuit forms a control signal of the same frequency, which is phase-shifted by 90° relative to $\underline{C}$, for controlling the analog switches (17) (18).

The switches therefore act as a 90° phase demodulator and pass the switched half waves onto the integrators (20) (21) (22) (23). The result of the rectification shifted in phase by 90° is that only the complex component produced by the Coriolis force reaches the integrators.

The integrators are driven in such a way by the control logic circuit that after integration of the half wave they make the integrated signal available to the analog-to-digital converter 24 for an adequate time, and are thereafter integrated downwards in order to integrate the subsequent, associated half wave. This process is repeated continuously, so that the signals $\underline{D}_{CA}$ and $\underline{D}_{CB}$, which depend on flow rate, are continuously detected. The advantage of this continuous detection of measured values is that the measuring effect is detected over the entire time, thus excluding beats with low-frequency interferers.

The control logic circuit (18) supplies the processor (25) with information as to when valid signals are present at the output of ADC 24. The analog-to-digital converter (24) can be designed in such a way that a multiplexer connects the input signals to an ADC.

The rectified value of $\underline{C}$ is fed to the processor (25) with the aid of a meter rectifier (15) and via an analog-to-digital converter (24). That is to say, the absolute value C of $\underline{C}$ is determined.

The frequency of C is measured by a frequency-measuring module (16). It is possible with the aid of the frequency to determine the root-mean-square value and/or rectified value of the integrated half waves at the output of the integrators (20, 21, 22, 23).

Equation 3 holds both for root-mean-square values and for rectified values since, in the case of a sinusoidal signal shape, these are linked by a constant factor which can be eliminated from the formula upon considering the ratios.

It is therefore possible to use the processor (25) to calculate the imaginary components $\underline{D}_{CACB}$ and $\underline{S}_{CACB}$ to calculate the flow rate by means of equation 23.

The proportionality constant k of equation 3 is dependent on temperature, for which reason the measuring tube temperature is measured. The temperature measuring signal (1) (for example PT100) is amplified by the input amplifier (6) and digitized with the aid of ADC (24).

The input/output unit (26) can include a display for data output, a keyboard for data input, one or more pulse outputs, one or more current outputs, various control input/outputs and various communications channels such as serial interfaces or, for example, a HART protocol interface.

The measuring tube vibration is maintained by a software-controlled PID controller (27) with the possibility of a programmable setpoint kp, ki and kd.

The input signal of PID Controller (27) is the sensor signal of C (3). The actual value is the rectified value of C at the output of the rectifier (15).

The output signal of PID Controller (27) is amplified by means of an amplifier (10) and supplies the energy for maintaining the mechanical vibration on the exciter circuit (5). The exciter (5) can be an electromechanical exciter, for example. That is to say, the amplitude of the tube vibration is kept constant at the point C.

The advantage of control at point C is that the amplitude is independent of flow rate. The otherwise customary control on the sum of the amplitudes of points A and C depends on the phase shift φ, since the absolute value of $\underline{A}$ and $\underline{C}$ depends on phase.

FIG. 8 shows the electronic implementation of the digital calculation of $\underline{D}_{CA}$ and $\underline{D}_{CB}$ using a DSP. Three sensors (2) (3) (4) are fastened on the measuring tube for the purpose of detecting the tube movement.

Movement sensors, speed sensors and acceleration sensors come into consideration as possible sensors. Moreover, the measuring tube temperature is measured. The sensor signals are amplified with the aid of the preamplifiers (6) (7) (8) (9). Antialiasing filters (11, 12, 13, 14) prevent violation of the sampling theorem. Analog-to-digital converters (15, 16, 17, 18) (for example iteration method, successive approximation or sigma delta method) transform the analog signals into digital signals.

Synchronization of the outputs of ADCs (16), (17) and (18) leads to synchronous sampling of the sensor signals (2, 3, 4).

A digital-to-analog converter (19) supplies the analog signal which, by means of an amplifier (10), supplies the energy for maintaining the mechanical vibration on the exciter circuit (5). The exciter (5) can be an electromechanical exciter, for example.

By contrast with the previous block diagram, i.e. FIG. 7, the filtering and calculation are performed digitally in the DSP (Digital Signal Processor).

The input-output unit can include a display for data output, a keyboard for data input, one or more pulse outputs, one or more current outputs, various control input/outputs and various communications channels such as serial interfaces or, for example, an HART protocol interface.

Figure 9:
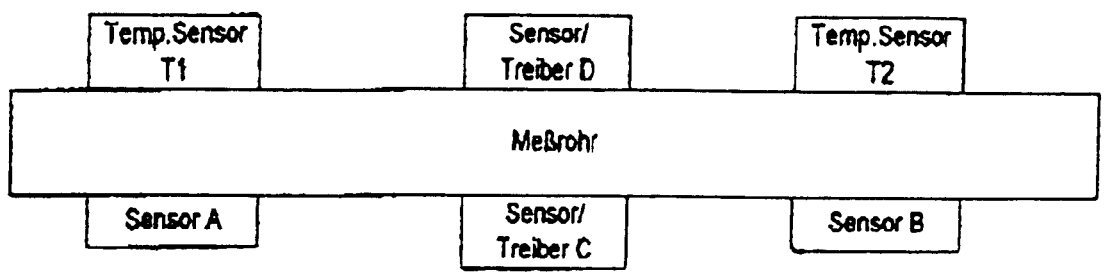
FIG. 9 shows a sensor arrangement with temperature sensors, in addition.

FIG. 9 shows an arrangement with a measuring tube through which the medium flows. Arranged here in the middle of the tube are 2 drivers C and D which can operate simultaneously as displacement sensors, or alternately as displacement sensors or drivers. The two displacement sensors A and B are placed symmetrically about the central site of vibration generation in the case of C/D. Temperature sensors T1 and T2 are likewise arranged at the sensor sites A and B.

The inclusion of temperature measurement at the sensor sites A and B has the consequence already described above.

FIG. 10 shows for the system of FIG. 9 an overview table from which all the states in the case of a sensor failing or experiencing interference emerge in a self-explanatory and/or self-revealing fashion. The leftmost column of the table shows the operating state of the sensors and sensor/drivers of the system of FIG. 9. To the right of that column are individual columns for each of the sensors and sensor/drivers shown in FIG. 9. These individual columns show the function performed by the associated sensor or sensor/driver for a given operating state in the leftmost column of the table.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A method for using the Coriolis measurement principle to measure the flow rate of media flowing through a measurement tube comprising:

(a) vibrating said measuring tube by an exciter located at a predetermined vibration generation point on said tube;

(b) measuring the amplitude of the deflection of said tube with sensors located at two other points of said tube which are spaced apart from said predetermined vibration generation point;

(c) measuring the amplitude of the deflection of said tube with a sensor located at said predetermined vibration generation point; and (d) determining the phase angle of the deflection measured at said two other measuring points of said tube using said amplitude deflection measured at said predetermined vibration generation point.

2. The method of claim 1, wherein the two other points of the sensors spaced apart from predetermined vibration generation point are situated at a distance from said predetermined vibration generation point in a symmetrical fashion.

3. The method of claim 1, wherein the flowing medium is divided into two subflows guided in parallel tubes, and the two parallel tubes are excited to vibrate in counterphase and the deflections of the two parallel tube sections are measured relative to one another.

4. The method of claimed in claim 3, wherein the excitation of the vibration of said two parallel tubes is performed at a resonant frequency of the two parallel tubes.

5. The method of claim 1 further comprising detecting the failure of any one of said sensors and continuing the measurement of said deflection amplitude of said tube using the two other correctly operating sensors until said failed sensor is replaced.

6. A device for using the Coriolis measurement principle to measure the flow rate of media flowing through a measurement tube comprising:
   (a) an exciter for vibrating said tube located at a predetermined vibration generation point on said tube;
   (b) first and second sensors located at two other points on said tube which are spaced apart from said predetermined vibration generation point for measuring the amplitude of the deflection of said tube;
   (c) a third sensor located at said predetermined vibration generation point for measuring the amplitude of the deflection of said tube; and
   (d) an evaluation unit responsive to said deflection amplitude measured at said predetermined vibration generation point and said deflection amplitude measured at said two other points for determining the phase angle of the deflection of said tube starting from said predetermined vibration generation point.

7. The device of claim 6, wherein there is arranged in the region of the measuring tube at least one temperature sensor with the aid of which the measuring tube temperature can be detected.

8. The device of claim 7, wherein two temperature sensors are provided, a temperature sensor being arranged on each sensor spaced apart from the vibration site.

9. The device of claim 8 wherein said evaluation unit contains logic which in the event of a malfunction in any one of said sensors reports said malfunction and simulates said malfunctioning sensor by interpolation until said malfunctioning sensor is replaced.

10. The device of claim 9 where said two other points on said tube at which said first and second sensors are located are symmetrical with respect to said predetermined vibration generation point on said tube.

11. The device of claim 8 where said two other points on said tube at which said first and second sensors are located are symmetrical with respect to said predetermined vibration generation point on said tube.

12. The device of claim 7 wherein said evaluation unit contains logic which in the event of a malfunction in any one of said sensors reports said failure and simulates said malfunction sensor by interpolation until said malfunctioning sensor is replaced.

13. The device of claim 12 where said two other points on said tube at which said first and second sensors are located are symmetrical with respect to said predetermined vibration generation point on said tube.

14. The device of claim 7 where said two other points on said tube at which said first and second sensors are located are symmetrical with respect to said predetermined vibration generation point on said tube.

15. The device of claim 6 wherein said evaluation unit contains logic which in the event of a malfunction in any one of said sensors reports said malfunction and simulates said malfunctioning sensor by interpolation until said malfunctioning sensor is replaced.

16. The device of claim 15 where said two other points on said tube at which said first and second sensors are located are symmetrical with respect to said predetermined vibration generation point on said tube.

17. The device of claim 6 where said two other points on said tube at which said first and second sensors are located are symmetrical with respect to said predetermined vibration generation point on said tube.

18. A method for using the Coriolis measurement principle to measure the flow rate of media flowing through a measurement tube comprising:
   (a) vibrating said measuring tube by an exciter located at a predetermined vibration generation point on said tube;
   (b) measuring the amplitude of the deflection of said tube with sensors located at two other points of said tube which are spaced apart from said predetermined vibration generation point;
   (c) measuring the amplitude of the deflection of said tube with a sensor located at said predetermined vibration generation point;
   (d) determining the phase angle of the deflection measured at said two other measuring points of said tube using said amplitude deflection measured at said predetermined vibration generation point; and
   (e) automatically detecting the malfunction of any one of said sensors located at said two other points of said tube and said sensor located at said predetermined vibration generation point.

19. The method of claim 12 further comprising continuing when a malfunction of any one of said first and second sensors and said sensor located at said predetermined vibration generation point is detected to use those of said first and second sensors and said sensor located at said predetermined vibration generation point which are not malfunctioning until said malfunctioning sensor is replaced.

* * * * *